United States Patent [19]
Rankin et al.

[11] Patent Number: 5,629,824
[45] Date of Patent: May 13, 1997

[54] HALL-EFFECT ARC PROTECTOR

[75] Inventors: Richard A. Rankin, Ammon; Dale K. Kotter, Shelley, both of Id.

[73] Assignee: The United States of America as represented by the United States Department of Energy, Washington, D.C.

[21] Appl. No.: 97,187

[22] Filed: Jul. 27, 1993

[51] Int. Cl.⁶ .................................................. H02H 9/00
[52] U.S. Cl. ............................ 361/57; 361/71; 361/88
[58] Field of Search ............................. 361/1, 2, 3, 7, 361/8, 88, 91, 56, 57, 45, 71, 74, 6

[56] References Cited

U.S. PATENT DOCUMENTS

| | | | |
|---|---|---|---|
| 3,558,977 | 1/1971 | Beaudoin | 361/6 |
| 3,654,519 | 4/1972 | South | 361/96 |
| 3,736,469 | 5/1973 | Baugher et al. | 361/74 |
| 4,214,289 | 7/1980 | Otsuka et al. | 361/20 |
| 5,185,685 | 2/1993 | Tennies et al. | 361/45 |

*Primary Examiner*—Jeffrey A. Gaffin
*Assistant Examiner*—Sally C. Medley
*Attorney, Agent, or Firm*—Bradley W. Smith; Thomas G. Anderson; William R. Moser

[57] ABSTRACT

The Hall-Effect Arc Protector is used to protect sensitive electronics from high energy arcs. The apparatus detects arcs by monitoring an electrical conductor, of the instrument, for changes in the electromagnetic field surrounding the conductor which would be indicative of a possible arcing condition. When the magnitude of the monitored electromagnetic field exceeds a predetermined threshold, the potential for an instrument damaging arc exists and the control system logic activates a high speed circuit breaker. The activation of the breaker shunts the energy imparted to the input signal through a dummy load to the ground. After the arc condition is terminated, the normal signal path is restored.

11 Claims, 2 Drawing Sheets

HALL-EFFECT ARC PROTECTOR

CONTRACTUAL ORIGIN OF THE INVENTION

The United States Government has rights in this invention pursuant to Contract No. DE-AC07-84ID12435 between the U.S. Department of Energy and Westinghouse Idaho Nuclear Company, Inc.

BACKGROUND OF THE INVENTION

All electrical conductors have capacitive and inductive properties and as a result, are capable of storing energy. If the insulating barrier between two conductors breaks down, a discharge path for the stored energy is formed, and a stored energy discharge along this path creates an "arc". If the energy discharge or "arc" exceeds the wattage rating of the passive components or of the solid state circuitry of the electrical equipment, the arc can damage the instrument.

An arc creates a low resistance path, thus, providing a path for the continual discharge of energy. The presence of in-line power supplies operate to sustain the arc condition by providing current to the arc path. The presence of the arc current creates a current spike which, in turn, generates an associated electromagnetic field spike.

Arcs are inherent in the design and operation of many electrical instruments and thus, cannot be totally eliminated. The presence of a high voltage in the instrument further complicates attempts at arc suppression since the voltage parameters associated with the high instrument voltage often exceed the ratings of potential high speed, solid state circuit breakers. In the past, this problem of arc suppression in high voltage instruments required the use of mechanical circuit breakers which did not have the sensitivity or the response time required to protect the instrument against damage from the arc.

Applicant's invention senses the presence of an arc by monitoring the strength of the electromagnetic field surrounding a conductor whose current and electromagnetic field are effected by the presence of the arc. The apparatus monitors the electromagnetic field through the use of a Hall-Effect transducer. When exposed to an electromagnetic field, the Hall-Effect transducer experiences an induced voltage which is proportional to the strength of the electromagnetic field. Since the onset of an arc results in a change in the electromagnetic field surrounding the conductor, the transducer experiences a change in the induced voltage in response to the arc. Therefore, by using a Hall-Effect transducer, one can correlate a direct relationship between the transducer's output voltage and the magnitude of the current surge caused by the arc.

In Applicant's invention, the output voltage from a Hall-Effect transducer is further conditioned and amplified, and then, this modified transducer signal is compared to a selected threshold value to determine whether or not the arc poses a danger to the instrument. If the arc exceeds the threshold value, a circuit breaker is engaged which shunts the arc-effected signal to ground. Input over-voltage protection is provided to the transducer through the use of back-to-back clamp diodes, and gain adjustment circuitry is employed to allow for adjustment in transducer sensitivity.

The above configuration employs hysteresis feedback techniques in sensing the condition of the circuitry and employs arc suppression delay filtering to detect arc propagation rates as fast as 100 nanoseconds with an impressed voltage of up to 10 KV superimposed on a dc voltage. By employing Applicant's system, the switching speed of the circuit breaker can be reduced from the millisecond range of the standard mechanical circuit breakers currently in use to microseconds.

This invention is useful because it requires only minor modification of the circuit. The invention simply clamps on an active circuit of the instrument and only requires the insertion of the arc suppression circuit, a switch and appropriate ground cables.

It is the objective of the present invention to provide arc protection to arc sensitive instrumentation operating at high instrument voltages. Another object of this invention is to provide for a variable threshold which must be exceeded by the strength of the arc in order to activate the high speed circuit breaker. It is, also, the object of the invention to provide for the rapid cycling of the high speed circuit breaker to minimize the off-line time of the instrument.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

SUMMARY OF THE INVENTION

To achieve the foregoing and other advantages, this invention uses a Hall-Effect transducer based arc protector to detect and protect an electrical device from damage which could result from the occurrence of an arc of sufficient energy to damage internal instrument circuitry. When the Hall-Effect transducer, in conjunction with threshold detection circuitry, detects a voltage spike associated with a potentially damaging arc, a circuit breaker shunts the instrument input signal through a dummy load to ground, thus protecting the instrument from the potentially damaging effects of the arc. A follow-on pulse, generated internally in the arc protector, rapidly resets the circuit breaker, and the normal signal path is reestablished.

BRIEF DESCRIPTION OF THE DRAWINGS

The present invention is illustrated in the accompanying drawings where.

DETAILED DESCRIPTION OF THE INVENTION

Figure 1:
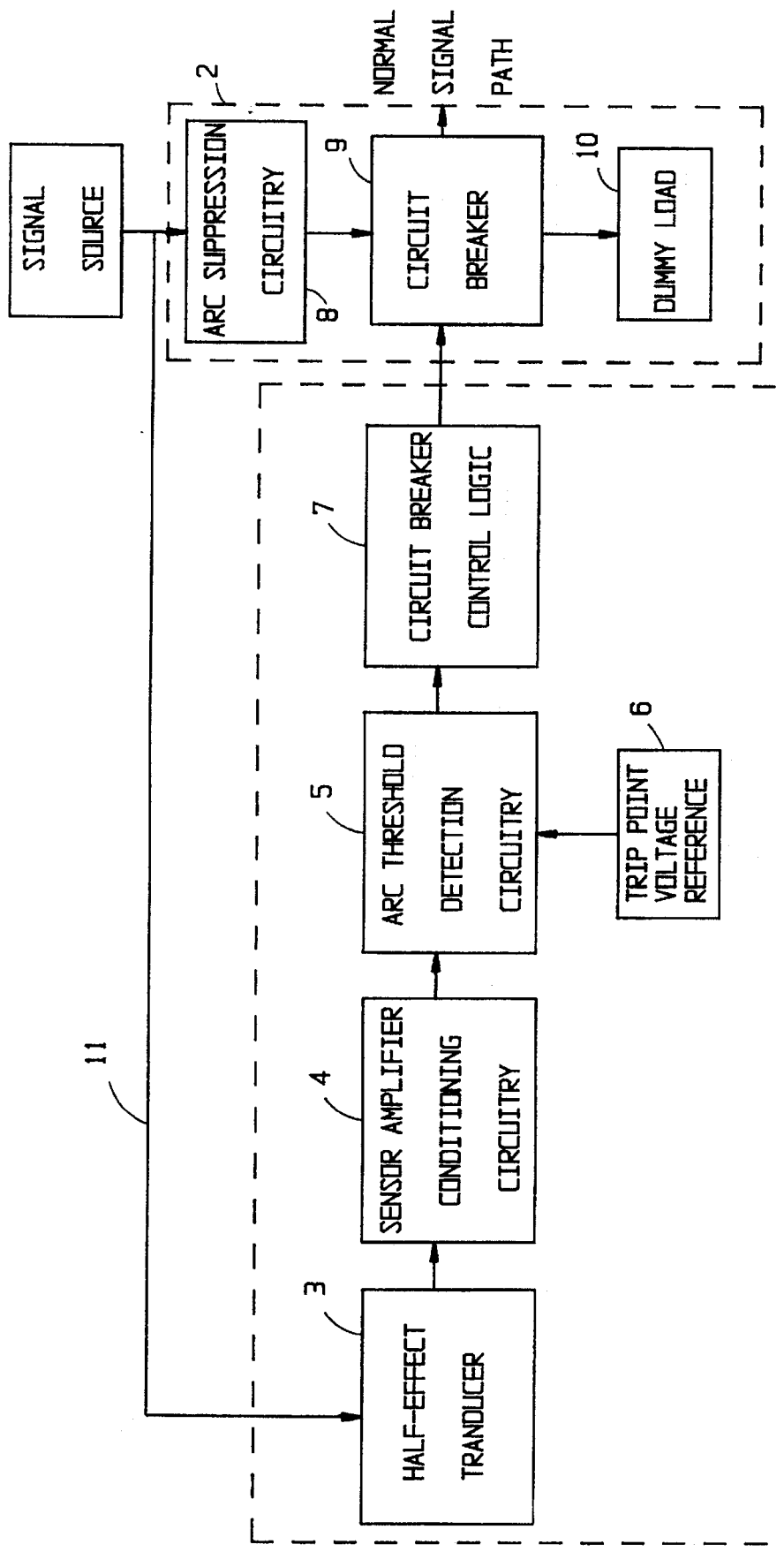
FIG. 1 is a component schematic of the Hall-Effect Arc Protector.

As is illustrated in FIG. 1, the Hall-Effect Arc Protector comprises two modules 1 and 2. The first module 1 contains the sensor or Hall-Effect transducer 3, the sensor amplifier conditioning circuit 4, the arc threshold detection circuitry 5, the trip point voltage reference 6, and the circuit breaker control logic 7. The second module 2 contains the arc suppression circuitry 8, the circuit breaker 9, and the dummy load 10. The subject invention monitors the instrument for the occurrence of arcing events without having to significantly modify the instrument. This is accomplished by clamping the sensor 3 to an instrument signal source conductor 11, which is then monitored for changes in the electromagnetic field surrounding the conductor 11. The second module 2 is designed to operate at dc-level potentials of up to 10 KV. When potentially damaging arcs are detected by the Hall-Effect Arc Protector, the circuit breaker shunts the signal to the dummy load 10.

Figure 2:
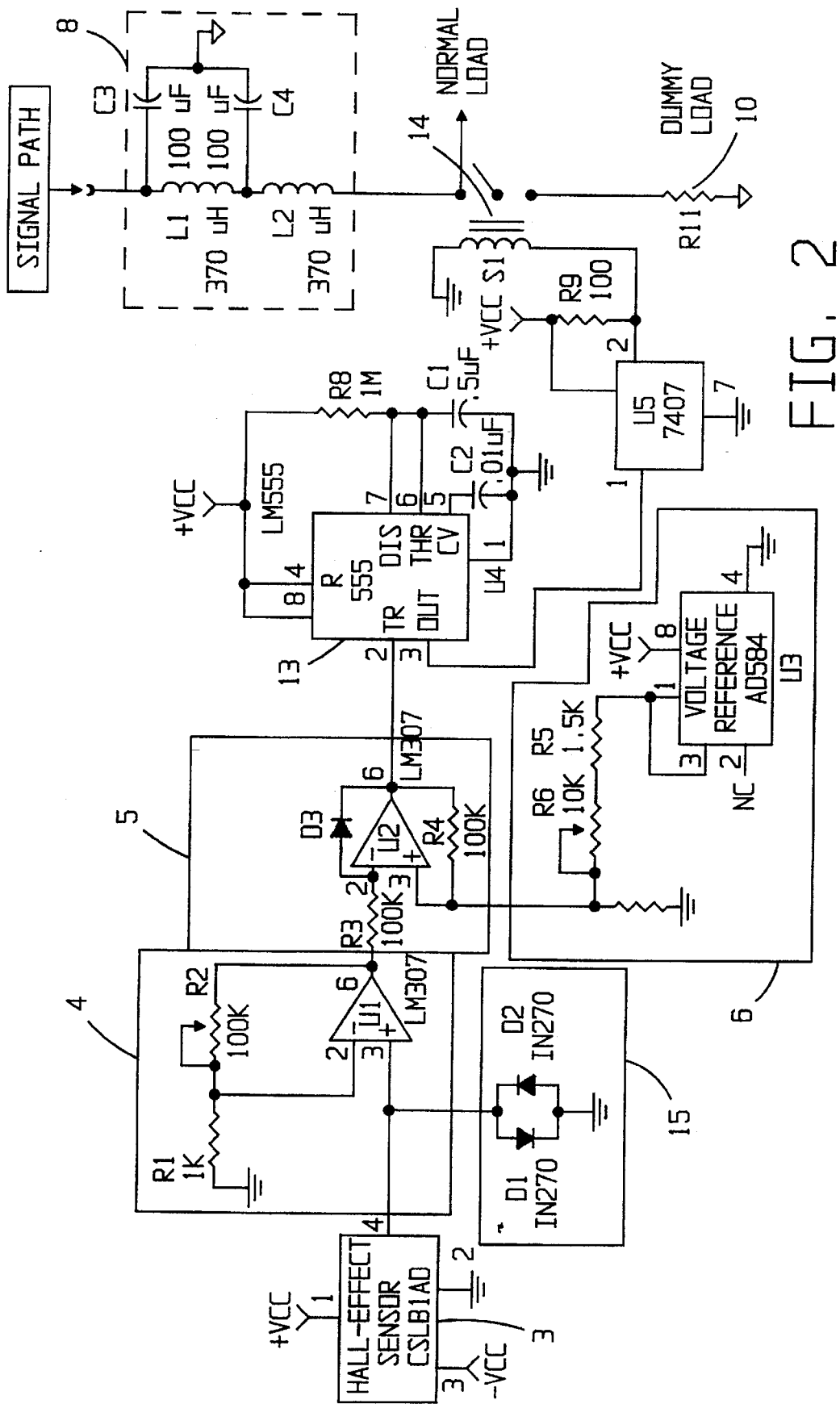
FIG. 2 is an electrical schematic of the Hall-Effect Arc Protector.

The sensor 3 is a Hall-Effect transducer 3, FIG. 2, which monitors the electromagnetic field associated with conductor 11. The transducer 3 experiences an induced voltage in proportion to the electromagnetic field associated with conductor 11. The electromagnetic field, surrounding the conductor 11, in turn is directly related to the current flowing in the conductor 11. As a result, when an arc forms, creating a current surge in the conductor 11, the electromagnetic field surrounding the conductor 11 changes in response to the current surge resulting in a change in the induced voltage experienced by the transducer 3 and a corresponding change in the voltage outputed to the subsequent arc detector circuit components.

The sensor amplifier and conditioning circuit 4 amplifies and conditions the output voltage of the sensor 3. The amplified voltage signal is then transmitted to the arc threshold detection circuit 5 whose response time is critical since arcs can quickly propagate and damage circuitry within the instrument. To avoid circuit damage the circuit breaker 9 must trip as quickly as possible. This rapid response time was achieved by designing a comparator 12, FIG. 2, internal to the detection circuit 5 where the comparator 12, FIG. 2, has a positive feedback. The comparator 12 provides a logic circuit to determine when a potentially damaging arc has occurred. The feedback feature causes a near instantaneous switch in the logic states in the presence of a damaging arc. Discrete components of the detection circuit 5 were selected to provide optimum hysteresis effects between the trip points. Optimization of the hysteresis property reduces the response time and eliminates several undesirable effects such as contact chatter and oscillation. The hysteresis provides a dead zone over which the comparator 12 will not be responsive. The dead zone eliminates false triggering of the comparator 12, FIG. 2, from the inductive ringing effects of arcs.

The trip voltage reference 6 provides for a user adjustable threshold or trip point which defines the threshold values at which the circuit will respond to a detected arc event. This allows the user to achieve the desired level of arc detection sensitivity.

When an arc is detected, the output of the differential comparator 12 switches states and activates a monostable multivibrator 13, FIG. 2. The multivibrator 13 generates a signal pulse having a predefined timed duration. The timed pulse is used to control the switching time of the relay 14 associated with the circuit breaker 9. The rising, or leading edge, of the pulse activates the circuit breaker 9 which in turn switches the instrument input signal to a dummy load 10 thereby absorbing the energy of the arc. The falling, or trailing edge, of the pulse resets the circuit breaker 9 and takes the dummy load 10 out of the circuit, thus, allowing the instrument input signal to resume its normal path. The time duration of the pulse is designed to allow sufficient delays to dissipate all the energy of the arc while resetting the circuit breaker circuit 9 in the minimum time to permit essentially uninterrupted operation of the instrument.

The circuit breaker control circuit 7 is a logic controlled circuit used to control the operation of the circuit breaker 9 and shunt the arc path to a dummy load 10.

The mechanical relay 14, FIG. 2, of the circuit breaker 9 is necessary to provide the required high voltage and current ruggedness. The arc propagation time is sufficiently delayed by the passive arc suppression circuitry 8 to compensate for the relatively slow switching time of the mechanical breaker 9. The circuit breaker 9 energizes with a high signal from the circuit breaker logic control 7. When the high signal is received the breaker 7 shunts the signal path to a dummy resistive load 10. The load 10 has sufficient impedance so that it does not act as a short with respect to the signal source, yet the load 10 provides a low resistance path to ground for unwanted arc energy.

The arc suppression circuit 8 contains a discrete Chebyshev LC filter 16, FIG. 2, to prevent instantaneous changes in the current. The LC filter 16, FIG. 2, is designed to provide for minimum insertion loss and is effectively transparent to the normal dc signal. The transfer function of the LC filter is designed to approximate an ideal low-pass filter. The cut-off frequency for the LC filter is set as close to dc as possible. When a transient arc occurs, the effective impedance of the filter increases to attenuate and/or delay the arc. This delay allows the circuit breaker 9 time to switch the current path before the arc propagates to more sensitive instrumentation.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A Hall-Effect arc protection system for protecting an instrument from the potentially damaging effects of an electrical arc, comprising:

a transducer coupled to a conductor of the instrument where said conductor is selected as having an input signal such that said input signal experiences a spike in the presence of an electrical arc and where said transducer outputs a voltage signal, having an output signal magnitude, in response to an input current flowing in said conductor, a threshold detection means coupled to said transducer where said detection means determines if said output signal magnitude exceeds a predetermined threshold value and if said threshold is exceeded, said detection means transmits an arc present signal, a pulse generation means coupled to said detection means for generating a pulsed signal, of a predetermined timed duration, in response to said arc present signal, an arc suppression means for preventing instantaneous changes in said input signal from being transmitted to sensitive components of the instrument by attenuating and delaying said arc where said arc suppression means is coupled to said conductor, and a circuit breaker means for shunting said input signal through a dummy load to ground in response to said pulsed signal from said pulse generation means where said pulsed signal triggers and resets said circuit breaker means providing for a predetermined interruption in current flow in said conductor, where said circuit breaker is coupled to said suppression means and said pulse generation means and serially coupled to said dummy load, and where said dummy load has sufficient impedance so that it does not act as a short with respect to a signal source.

2. The apparatus of claim 1 in which said voltage signal is modified by an amplification circuit to produce an enhanced voltage signal having an enhanced signal magnitude where said amplification circuit is coupled to said transducer.

3. The apparatus of claim 2 in which said transducer is a Hall-Effect transducer for which said output voltage is proportional to an input current in said conductor.

4. The apparatus of claim 3 in which said threshold detection means provides for a variable threshold which can be set to a threshold value which if exceeded by said enhanced signal magnitude would indicate the presence of an instrument damaging arc.

5. The apparatus of claim 4 in which said threshold detection means includes a comparator logic circuit having a logic output which is responsive to said arc present signal.

6. The apparatus of claim 5 in which said logic circuit is coupled to a multivibrator having an output which is responsive to said logic output where said multivibrator output is a predetermined pulsed signal having a leading edge and a trailing edge where said leading edge triggers said circuit breaker means and said trailing edge resets said circuit breaker means allowing said input signal to resume a normal electrical path through said instrument.

7. The apparatus of claim 1 in which said arc suppression means is a low pass filter providing a means of suppressing said arc and a means to time delay said arc to allow said circuit breaker means to become activated.

8. The apparatus of claim 1 including an input overvoltage protection means for protecting the system from a potentially damaging input from said transducer.

9. An apparatus for suppressing the effects of a damaging arc present in an instrument comprising:

a Hall-Effect transducer coupled to an instrument conductor where said conductor prefaces portions of the instrument which might be damaged by the arc and where an input current flowing in said conductor would experience an increase in current in response to an arcing event;

an amplification and conditioning circuit coupled to said transducer where said amplification and conditioning circuit modifies a transducer output signal to produce a modified transducer output signal;

an arc trip voltage reference means to provide a user adjustable threshold level at which the apparatus will respond to a detected arc event;

a comparator logic circuit coupled to said reference means and said amplification circuit where when said modified transducer output signal exceeds said threshold level said logic circuit outputs a logic signal;

a multivibrator responsive to said logic circuit wherein said multivibrator responds to said logic signal by transmitting a pulsed signal to a circuit breaker means where said circuit breaker means is triggered by a leading edge of said pulsed signal and is automatically reset by a trailing edge of said pulsed signal;

an arc suppression circuit where said arc suppression circuit attenuates and delays the transmission of a current spike created by said arc to allow said circuit breaker means to be activated where said suppression circuit is coupled to said conductor and to said circuit breaker means;

a dummy load circuit serially coupled to said circuit breaker means where said dummy load circuit is activated when said circuit breaker means is triggered and where when activated said dummy load circuit acts as a pathway for transmission of said arc through said dummy load to ground instead of allowing said arc to propagate to a sensitive portions of the instrument where damage could occur.

10. The apparatus of claim 9 wherein said pulsed signal has a predetermined signal width.

11. The apparatus of claim 9 including an input overvoltage protection means for protecting the system from a potentially damaging input from said transducer.

* * * * *